(12) United States Patent
Baehrle-Miller et al.

(10) Patent No.: US 11,945,427 B2
(45) Date of Patent: Apr. 2, 2024

(54) METHOD AND DEVICE FOR SECURING A MOTOR VEHICLE DURING AN AUTOMATED DRIVING MANOEUVRE

(71) Applicant: Robert Bosch GmbH, Stuttgart (DE)

(72) Inventors: Frank Baehrle-Miller, Schoenaich (DE); Hubertus Wienken, Langenbrettach (DE)

(73) Assignee: Robert Bosch GmbH, Stuttgart (DE)

( * ) Notice: Subject to any disclaimer, the term of this patent is extended or adjusted under 35 U.S.C. 154(b) by 470 days.

(21) Appl. No.: 17/284,339

(22) PCT Filed: Sep. 4, 2019

(86) PCT No.: PCT/EP2019/073561
§ 371 (c)(1),
(2) Date: Apr. 9, 2021

(87) PCT Pub. No.: WO2020/078613
PCT Pub. Date: Apr. 23, 2020

(65) Prior Publication Data
US 2021/0347341 A1 Nov. 11, 2021

(30) Foreign Application Priority Data
Oct. 15, 2018 (DE) ...................... 10 2018 217 618.3

(51) Int. Cl.
*B60T 8/171* (2006.01)
*B60T 8/92* (2006.01)
(Continued)

(52) U.S. Cl.
CPC ................ *B60T 8/171* (2013.01); *B60T 8/92* (2013.01); *B60T 13/148* (2013.01);
(Continued)

(58) Field of Classification Search
CPC ....................................................... B60T 8/171
See application file for complete search history.

(56) References Cited

U.S. PATENT DOCUMENTS 8,634,999 B2 * 1/2014 Bach ...................... B60T 7/122
303/192
2010/0292902 A1 11/2010 Bach et al.
(Continued)

FOREIGN PATENT DOCUMENTS

DE 10 2007 023 928 A1 11/2008
DE 10 2012 212 090 A1 1/2014
(Continued)

OTHER PUBLICATIONS

International Search Report corresponding to PCT Application No. PCT/EP2019/073561, dated Dec. 20, 2019 (German and English language document) (5 pages).

*Primary Examiner* — Michael A Berns
(74) *Attorney, Agent, or Firm* — Maginot, Moore & Beck LLP (57) ABSTRACT

A method for securing a motor vehicle with at least one wheel brake during an automated driving maneuver includes, in order to carry out the automated driving maneuver, setting a hydraulic pressure at the wheel brake in order to generate a defined braking force large enough to securely arrest the motor vehicle during the execution of the automated driving maneuver. The method further includes keeping the hydraulic pressure which is set at the wheel brake essentially constant during the execution of the automated driving maneuver. The method may be implemented in a device.

15 Claims, 3 Drawing Sheets

(51) Int. Cl.
  *B60T 13/14* (2006.01)
  *B60T 13/66* (2006.01)
(52) U.S. Cl.
  CPC ......... *B60T 13/662* (2013.01); *B60T 2201/10* (2013.01); *B60T 2270/88* (2013.01)

(56) References Cited

U.S. PATENT DOCUMENTS

2017/0327098 A1* 11/2017 Leiber ..................... B60T 7/042
2021/0347341 A1* 11/2021 Baehrle-Miller ..... B60T 13/662

FOREIGN PATENT DOCUMENTS

| DE | 10 2015 216 214 A1 | 3/2017 |
| DE | 10 2016 213 645 A1 | 2/2018 |
| DE | 10 2016 213 666 A1 | 2/2018 |
| DE | 10 2018 210 232 A1 | 12/2019 |
| WO | 2014/001067 A1 | 1/2014 |

* cited by examiner

METHOD AND DEVICE FOR SECURING A MOTOR VEHICLE DURING AN AUTOMATED DRIVING MANOEUVRE

This application is a 35 U.S.C. § 371 National Stage Application of PCT/EP2019/073561, filed on Sep. 4, 2019, which claims the benefit of priority to Serial No. DE 10 2018 217 618.3, filed on Oct. 15, 2018 in Germany, the disclosures of which are incorporated herein by reference in their entirety.

The present disclosure relates to a method for securing a motor vehicle with at least one wheel brake during an automated driving maneuver, wherein before execution of the automated driving maneuver a hydraulic pressure is set at the wheel brake in order to generate a defined braking force, wherein the braking force is large enough to reliably stop the motor vehicle during the execution of the automated driving maneuver. According to the disclosure, the method is characterized in that the hydraulic pressure which is set at the wheel brake is kept essentially constant during the execution of the automated driving maneuver. Furthermore, the disclosure relates to a device which is configured to implement the method.

Background

For example patent application DE 10 2015 216 214 A1 is known from the prior art, in which application the parking brake is moved for highly automated parking functions into a predefined position which lies between completely opened and completely closed. The vehicle can also be maneuvered in this context. In the event of the brake having to be closed during the maneuver, e.g. because of a suddenly occurring obstacle, this is possible much more quickly since a build-up of force from the new position takes place much more quickly.

Patent Application DE 10 2012 212 090 A1 is also known from the prior art. This document relates to a motor vehicle which is configured to carry out driverless driving maneuvers, wherein when a driverless driving maneuver is carried out said motor vehicle reliably stops if the power supply fails.

This is made possible by virtue of the fact that during the driverless driving maneuver a brake pressure is built up by means of one of the brake systems, and the drive force operates against this brake pressure.

The permanent provision of a braking torque during the automated parking maneuver can cause the temperature of the brakes to change. That is to say in particular the brake disks and the brake linings can change their temperature during the maneuver. Depending on the way it is implemented, the maneuver can also last for a relatively long time (e.g. parking in a multistorey car park). In addition to the brake disk and brake linings, the temperatures in the adjoining components (e.g. brake fluid) also change. As a result of the thermal change in lengths and change in volume, the braking torque can rise significantly during the maneuver. At best, this causes the required drive torque and consumption of energy as well as the wear of the brake linings to increase. However, it can also lead to the vehicle seizing up and thus the driving maneuver being aborted or a complete failure of the functional capability.

These beatings—and thermal changes in length and volume which are caused by them and resulting increases in braking torque—can of course occur both during a maneuver for entering a parking space as well as one for exiting a parking space or during any other automated driving maneuver which requires a certain time period.

Furthermore, the situation can also arise in which the brake system is cooled. For example, if, after a manual journey by the driver, an automated driving maneuver starts at the target location with the motor vehicle having a hot brake system owing to his driving style or the traffic flow. In this case, it is possible for the motor vehicle to be intermediately parked at a transfer location and for the motor vehicle to look for the ultimate parking space. This process can last several minutes. During the journey, the motor vehicle is continuously braked but nevertheless a cooler brake temperature occurs owing to the thermal equilibrium. As a result of the thermal changes in length of the brake components or changes in volume of the brake fluid, the clamping force during the maneuver is reduced. This constitutes a corresponding safety risk and/or cancels out the fall-back level desired as a result of the prestressed brake.

Summary

In contrast, the method and device according to the disclosure advantageously permit the effects of changes in length and volume in the brake system to be greatly reduced. That is to say, a constant braking force is provided irrespective of how long the parking process lasts and/or to what extent the temperatures of the components change. This is made possible both when there is an increase as well as when there is a reduction in the temperature of the brake system. This increases the safety.

This is made possible according to the disclosure by means of the features specified below. Further refinements of the method and device are also described in the following description.

A method for securing a motor vehicle with at least one wheel brake during an automated driving maneuver is therefore provided, wherein before execution of the automated driving maneuver a hydraulic pressure is set at the wheel brake in order to generate a defined braking force, wherein the braking force is large enough to reliably stop the motor vehicle during the execution of the automated driving maneuver. According to the disclosure, the method is characterized in that the hydraulic pressure which is set at the wheel brake is kept essentially constant during the execution of the automated driving maneuver.

This is understood to mean that a constant pressure level is made possible at the wheel brake while the driving maneuver is being carried out. A constant pressure at the wheel brake permits a constant braking force. The method therefore permits a braking force to be maintained at a constant level during the entire execution of the driving maneuver. Pressure fluctuations or pressure increases or pressure reductions which occur in the brake fluid are compensated. The method can therefore advantageously provide for a device for equalizing pressure to be activated during the execution of the automated driving maneuver. Compensation can be made possible, for example, by means of a change in volume. Therefore, the method can provide for an accumulator for accommodating volumes of fluid to be activated during the execution of the automated driving maneuver. Such an accumulator for accommodating volumes of fluid for equalizing pressure can be referred to as a pressure equalization element or pressure accumulator. There is advantageously provision that the pressure is kept constant in an automated fashion. This can be made possible for example by means of a pressure equalization element as a spring-loaded piston system.

It is also to be understood that the pressure is kept constant during the entire time that the driving maneuver is carried out, that is to say during the entire execution of the driving maneuver. It is explicitly mentioned that this is also intended to take place during the normal execution of the driving maneuver, that is to say not only in an emergency situation. An automated driving maneuver is to be understood as being any driving maneuver which does not require the driver to intervene. This is to be understood as including in particular driving maneuvers which permit a long transfer time or even absence of the driver. An example of this is a highly automated parking process in which the driver does not have to sit in the vehicle.

The hydraulic pressure is maintained while the driving maneuver is being carried out, so that a drive force has to overcome the generated braking force in order to carry out the driving maneuver or to move the motor vehicle. In this sense, one can refer to execution of an automated driving maneuver with application of a brake pressure.

The hydraulic pressure which is set is advantageously high enough to bring the motor vehicle to a standstill from the maximum possible speed during the driving maneuver. In particular, the pressure is high enough to bring the motor vehicle reliably to a standstill when a drive torque fails to be provided by the drive motor. Reliable stopping is defined as being when a defined braking distance can be maintained, in particular when there is a defined loading of the motor vehicle and coefficient of friction with the road. The motor vehicle can also advantageously be reliably stopped on a defined gradient.

In one advantageous embodiment, the method is characterized in that the hydraulic pressure at the wheel brake is kept constant independently of the energization during the execution of the automated driving maneuver.

This is to be understood as meaning that there is no need for any energization to maintain the hydraulic pressure which is set—and therefore the resulting braking force—at the set level. Furthermore, there is also no need for a controller to keep the hydraulic pressure constant. The brake pressure is therefore maintained without energization, for example by means of a valve which is closed in the deenergized state.

Furthermore, this is to be understood as meaning that during the entire automated driving maneuver there is no need to build up pressure in order to brake the motor vehicle. The pressure which is set is sufficient to permit braking of the motor vehicle in any situation. Therefore, during the automated driving maneuver it is advantageously possible to dispense with actuation of the electric actuator in order to generate braking force.

For example there can also be provision that during an automated driving maneuver a hydraulic build-up of pressure is carried out only at the wheel brakes by means of an electric actuator at which the brake pressure which is set is not kept constant independently of energization.

In one possible refinement, the method is characterized in that a pressure equalization element is connected to the wheel brake, in particular in that a pressure equalization element is connected to the wheel brake before the execution of the automated driving maneuver.

This is understood as meaning that there is a pressure equalization element which can be switched on and is hydraulically connected to the wheel brake. For example, hydraulic coupling of the pressure equalization element occurs before or at the start of the execution of the driving maneuver. The pressure equalization element can for this purpose be switched on by means of a storage-type isolating valve. In particular, a valve which is open in the deenergized state or a bistable valve is suitable for this. Before the execution of the automated driving maneuver, the valve is switched in such a way that the pressure equalization element is activated, i.e. is connected to the wheel brake. Subsequently, the pressure at the wheel brake is set. This pressure is correspondingly also built up at the connected pressure equalization element. During the execution of the driving maneuver, the pressure equalization element remains hydraulically connected to the wheel brake to which pressure is applied. The pressure equalization element permits in this context a compensation of pressure by taking up volumes of fluid and outputting volumes of fluid. This makes it possible for the applied pressure, and therefore the braking force, to be kept constant, even if an expansion of volume occurs in the brake fluid or the components of the wheel brake.

In one preferred embodiment, the method is characterized in that the hydraulic pressure which is set at the wheel brake is locked in by means of a shutoff valve before the execution of the automated driving maneuver.

This is understood as meaning that after the build-up and setting of the required hydraulic pressure, said pressure is locked in at the wheel brake and maintained. The volume of fluid remains locked in at the wheel brake by this shutoff valve during the entire execution of the driving maneuver. In particular a valve which is closed in a deenergized state or a bistable valve is suitable as a valve. The connection between the wheel brake and a pressure equalization element is intended not to be interrupted by this circuit. Correspondingly, a hydraulic connection continues to be present between the wheel brake and the pressure equalization element, and the same pressure continues to be present at both elements.

In one alternative development, the method is characterized in that after the execution of the automated driving maneuver the brake system is transferred into at least one of the following states:
  into a secured state,
  into a pressureless state, and
  into a regular state.

This is understood as meaning that after the automated driving maneuver has been carried out, a specific state is set for the motor vehicle or in the brake system. For example, a secured state is set for the motor vehicle. This can be done by activating the automated parking brake. The motor vehicle is continuously arrested by this means. Alternatively or additionally, a pressureless state is set. To do this, the shutoff valve, which maintains the pressure which has been set at the wheel brake, is opened, and the pressure is correspondingly discharged. Furthermore as an alternative or additional possibility the brake system is transferred into a regular state. This is to be understood as meaning in particular, the uncoupling of the pressure equalization element from the wheel brake. Therefore, the hydraulic connection between the two elements is interrupted, for example by switching the bistable storage-type isolating valve into the closed state. This avoids an adverse effect on the service brake during a later braking process.

In one advantageous refinement, the method is characterized in that when the hydraulic pressure at the wheel brake is increased by a defined threshold value,
  in the case of a completely functionally capable brake system the defined braking force is set anew by reducing the hydraulic pressure and the automated driving maneuver continues to be carried out, and, in the case of a brake system which is not completely functionally capable the automated driving maneuver is aborted.

In this case, two action paths are indicated, as to how to proceed in the case of a marked increase in the hydraulic pressure which is set at the wheel brake. An increase in the brake pressure as a result of heating of the brake system owing to the braking torque which is set during the automated driving maneuver can be compensated completely by the described pressure equalization element. However, it is conceivable that in specific situations an increase in the hydraulic pressure occurs at the wheel brake, for example through intervention of the driver during the automated driving maneuver and bypassing of the shutoff valve. If the brake pressure exceeds a defined limit, it is not possible to continue the automated driving maneuver during which driving is being carried out against this brake pressure. It should be correspondingly checked whether the brake system is functionally capable. If the brake system is functionally capable, the increased pressure is reduced until the originally set hydraulic pressure is present again. For example, the pressure is discharged by briefly opening the shutoff valves. If the hydraulic pressure is correspondingly reached again, the shutoff valves are closed and the automated driving maneuver can continue to be carried out. Alternatively, it is also possible, when there is a correspondingly configured pressure equalization element, to bring about a corresponding increase in volume and reduction in pressure for example by adjusting the piston and the spring until the originally set hydraulic pressure is reached again and the driving maneuver can continue to be carried out.

However, if the brake system is not completely functionally capable, in particular if controlled regulation of the shutoff valves is not possible, the automated driving maneuver is aborted. The motor vehicle is then arrested and information or control is transferred to the driver.

Furthermore, according to the disclosure a device is provided which is configured to carry out the described method. The advantages which are achieved by this device correspond generally to those already described with respect to the method. Possible refinements of such a device are outlined by way of example below.

In one advantageous embodiment, the device is configured to keep essentially constant a hydraulic pressure which has been set at a wheel brake to generate a defined braking force, in order to generate a defined braking force during the execution of an automated driving maneuver, wherein the braking force is large enough to reliably stop the motor vehicle during the execution of the automated driving maneuver.

This is understood as meaning that the device is embodied in such a way that it permits a hydraulic pressure which is provided at a wheel brake, when an automated driving maneuver is started, to be maintained over the entire time of the automated driving maneuver. In which case the pressure is kept constant at its level of pressure. Pressure fluctuations or increases in pressure and reductions in pressure are picked up by the device and neutralized. In one advantageous configuration, the device is also embodied in such a way that it keeps the hydraulic pressure constant independently of energization during the execution of the automated driving maneuver.

In one possible refinement, the device comprises a pressure equalization element which can take up fluid volume when there is an increased pressure at the wheel brake and can output fluid volume when there is a reduced pressure at the wheel brake, and is configured in particular as a spring-loaded piston system.

This is understood as meaning that the device comprises a means which by virtue of its ability to take up and discharge volumes of fluid makes it possible to keep a defined system pressure constant. In particular, when the system pressure changes or the volume of fluid changes in the brake system, heating or cooling of a component of the brake system, in particular wheel brake, and of a brake fluid makes it possible to keep a hydraulic pressure constant. A pressure equalization element is provided for this. This said element is, for example, advantageously configured as a spring-piston system. The pressure equalization element is alternatively also configured as a gas pressure accumulator.

The pressure equalization element is also embodied in such a way that it can be switched on. That is to say in the activated state the described method of functioning is active; the pressure equalization element interacts with the rest of the brake system. In the deactivated state, the method of functioning of the pressure equalization element is suspended, i.e. there is no corresponding action in the brake system. The pressure equalization element is not only correspondingly configured to achieve the described effect, it is also installed at a corresponding location in the brake system in order to perform its function. Likewise, it is configured in such a way that it can be hydraulically connected to further relevant components.

In one preferred embodiment, the pressure equalization element is configured so as to be capable of being connected to the wheel brake by means of a storage-type isolating valve.

The storage-type isolating valve permits the pressure equalization element to be disconnected and connected to and from the brake system. In particular the storage-type isolating valve permits connection and disconnection to and from a wheel brake. If the fluid volume absorption capability is desired for pressure compensation, for example during a highly autonomous parking maneuver, the pressure equalization element can be connected hydraulically by means of this valve. However, if such a function is not desired, for example during regular service braking, this function can be deactivated by hydraulic disconnection of the pressure equalization element by means of this valve.

The storage-type isolating valve can, for example, be embodied as a valve which is open in the deenergized state, in order to maintain the connection of the wheel brake to the pressure equalization element even when an energization-fails during an automated driving maneuver.

However, this valve is advantageously embodied in a bistable fashion, in order to be able to avoid unnecessarily consuming current in the closed position during manual operation of the vehicle by a driver. A bistable valve can therefore assume two positions: stable (without energization) open and stable (without energization) closed. The valve can be switched from one position into the other by means of a current pulse, for example.

In an alternative development, the device comprises a shutoff valve by means of which a pressure which is built up at the wheel brake can be locked in.

The shutoff valve permits a hydraulic pressure to be locked in at the wheel brake. By closing the valve it is possible to lock in, and therefore maintain, a pressure which has been built up at the wheel brake. The shutoff valve can be embodied, for example, as a valve which is closed when deenergized, in order to permit the locking in—and therefore maintenance—of the hydraulic pressure at the wheel brake even when an energization fails during an automated driving maneuver. However, this valve is advantageously embodied in a bistable fashion, in order to be able to avoid unnecessarily consuming any current in the open position during manual operation of the motor vehicle by a driver.

In one advantageous refinement, the valve is configured in such a way that it can be bypassed in its closed position. This means that the valve has a blocking function which opens, however, at a defined overpressure and permits pressure equalization or transmission of fluid. Opening takes place, in particular, only unidirectionally—it therefore takes place only in reaction to a pressure from one direction. The shutoff valve is therefore installed in the brake system in such a way that when there is a pressure difference present or there is a defined pressure level only pressure upstream of the valve (i.e. in the hydraulic system) is passed on in the direction of the wheel brake, but a pressure downstream of the valve (i.e. at the wheel brake) is not passed on in the direction of the hydraulic system. The valve is configured, for example, in such a way that in the closed state a defined pressure is kept locked in. When a relatively high pressure is present in the hydraulic system upstream of the valve—for example through activation of a foot pedal by the driver—this pressure is, however, passed on to the wheel brake via the valve, and the pressure which is then increased at the wheel brake is locked in by means of the shutoff valve.

In one preferred refinement, the device is configured as a hydraulic module, comprising:
 a pressure generating device with an electric actuator for generating a hydraulic pressure at the wheel brake,
 a connecting device with a shutoff valve for coupling or disconnecting the wheel brakes to or from the pressure generating device, and
 a pressure equalizing device with a pressure equalization element for volume compensation at the wheel brake.

The hydraulic module advantageously also comprises a switchable connecting device with a storage-type isolating valve for coupling or decoupling the pressure equalization element to or from the wheel brake.

In particular a classic ESP module is suitable as a pressure generating device. The pressure generating device for generating a hydraulic pressure at the wheel brake comprises here at least one hydraulic pump which is driven by an electric motor for generating a fluid volume flow and an inlet valve in order to direct the fluid volume flow to the wheel brake, and an outlet valve in order to divert fluid volume from the wheel brake. For example, what is referred to as an iBooster (electronic brake booster) is also suitable as a pressure generating device.

Furthermore, according to the disclosure a control device is provided which is configured to carry out the method. A control device can be understood here to be an electrical device which processes sensor signals and outputs control signals and/or data signals as a function thereof. This device can have an interface which can be embodied by means of hardware and/or software. In a hardware embodiment, the interfaces may be, for example, part of what is referred to as a system ASIC which includes a wide variety of functions of the device. However, it is also possible that the interfaces are separate integrated circuits or are composed at least partially of discrete components. In the case of a software embodiment, the interfaces may be software modules which are present, for example, on a microcontroller alongside other software modules. Furthermore, a computer program is disclosed, which is configured to carry out the method. Furthermore, a machine-readable storage medium is provided in which such a computer program is stored.

BRIEF DESCRIPTION OF THE DRAWINGS

It is to be noted that the features which are specified individually in the description can be combined with one another in any desired technically appropriate way and indicate further refinements of the disclosure. Further features and expedient characteristics of the disclosure emerge from the description of exemplary embodiments on the basis of the appended figures.

In the drawings.

DETAILED DESCRIPTION

Figure 1:
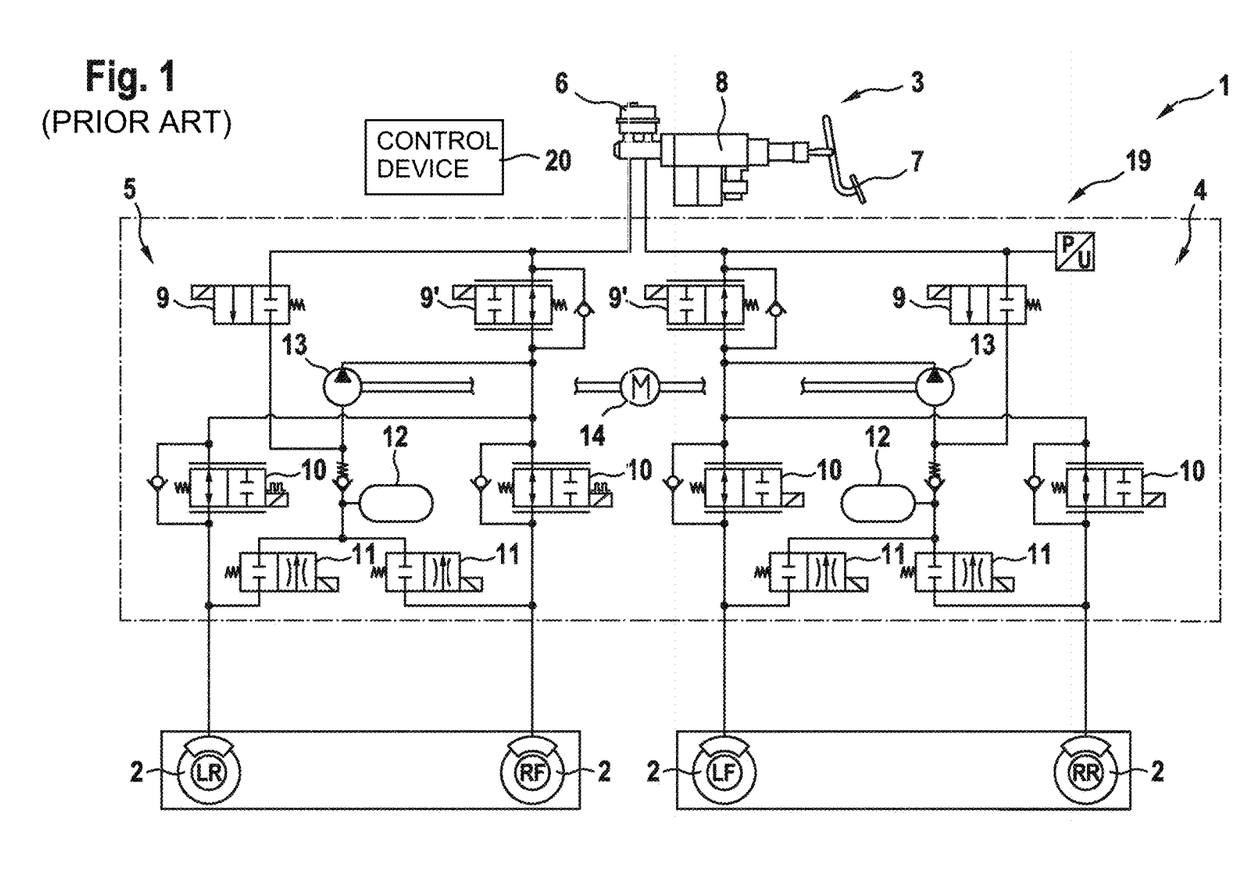
FIG. 1 shows a brake system of a motor vehicle in a simplified illustration.

FIG. 1 shows a simplified illustration of a brake system 1 for a motor vehicle (not illustrated in more detail) according to the prior art. The brake system 1 has a plurality of wheel brakes 2 which can be actuated by a driver of the motor vehicle by means of a brake pedal device 3 as service brakes. The wheel brakes 2 are referred to here by LR, RF, LF and RR, which clarifies their position or assignment on the motor vehicle, wherein LR stands for left rear, RF for right front, LF for left front and RR for right rear.

The elements which form the hydraulic module 19 are outlined by dashes. Said module is also referred to as an ESP module. In this context, two brake circuits 4 and 5 are formed, wherein the brake circuit 4 is assigned to the wheel brakes LF and RR, and the brake circuit 5 to the wheel brakes LR and RF. The two brake circuits 4 and are of identical construction, so that the design of the two brake circuits 4, 5 will be explained in more detail below with reference to the brake circuit 4.

The brake circuit 4 is firstly connected to a master brake cylinder 6 of the brake pedal device 3, wherein the brake pedal device 3 also has a brake pedal 7 which can be actuated by the driver and a brake booster 8. The brake booster can be actuated, for example, pneumatically or electromechanically. The brake circuit 4 has a switching valve 9' and a high-pressure switching valve 9, which are connected parallel to one another and followed by the master brake cylinder 6. The switching valve 9' is constructed to be open in the deenergized state and permits the hydraulic medium of the brake circuit, that is to say the brake fluid, to flow in both directions. The high-pressure switching valve 9 is embodied so as to be closed in a deenergized state and when energized it permits brake fluid to flow through only in the direction of the wheel brakes 2. The switching brake 9' is also connected to the two wheel brakes 2 with intermediate connection of one inlet valve 10 in each case, said inlet valve 10 being designed to be opened in both directions in the deenergized state. The wheel brakes 2 of the brake circuit 4 are also each assigned an outlet valve 11 which is designed to be closed in the deenergized state. A hydraulic pressure accumulator 12 is connected downstream of the outlet valves 11. The outlet valves 11 are also connected on the outlet side to a suction side of a pump 13 which is connected on the pressure side to the brake circuit 4 between the switching valve 9' and the inlet valves 10. If the two switching valves 9' of the brake circuits 4, 5 are closed, the hydraulic pressure in the section of the brake circuits 4, 5 lying downstream, that is to say between the switching valves and the wheel brakes 2, remains locked in or maintained, even if the brake pedal 7 is relieved of loading via the driver.

The pump 13 is mechanically coupled to an electric motor 14. There is provision that the electric motor 14 is assigned to the pumps 13 of both brake circuits 4 and 5. Alternatively there can also be provision that each brake circuit 4, 5 has a separate electric motor 14. A control device 20 controls both the electric motor 14 and the valves 9, 9', 10, 11. An ESP module can also independently build up a brake pressure by means of the electric motor 14.

Figure 2:
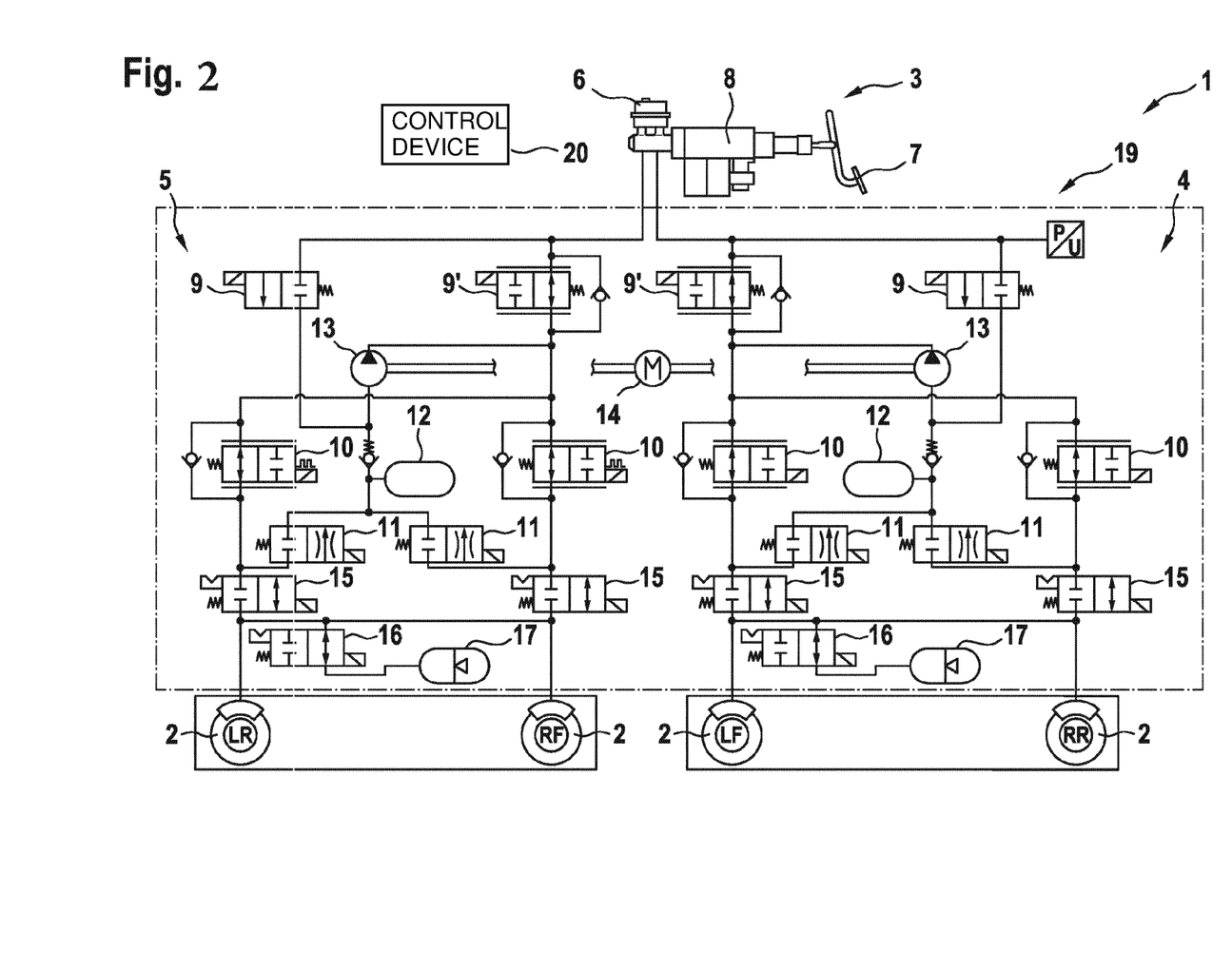
FIG. 2 shows a brake system with a pressure equalization element.

FIG. 2 shows a detail of a brake system according to a first refinement of the disclosure with a pressure equalization element. In an expansion of FIG. 1, the hydraulic module 19 comprises here a pressure equalization element 17 (also referred to as a pressure accumulator 17). The pressure equalization element 17 can be integrated into the housing of the hydraulic module 19. Alternatively, said module is directly screwed onto the housing thereof. Furthermore, the pressure equalization element 17 can also be accommodated elsewhere in the vehicle; it then merely has to be connected hydraulically to corresponding brake lines.

The connection of the pressure equalization element 17 to a brake circuit 4 or 5 makes it possible to reduce the effects of the thermal changes in length and thermal changes in volume. The pressure equalization element 17 is disconnected in the driving mode, i.e. decoupled by means of a closed valve. This ensures that the service brake system remains unaffected. In order to protect a planned automated driving maneuver, for example a highly automated driving maneuver, the decoupling of the pressure equalization element 17 is cancelled. The hydraulic brake system 1 therefore provides the corresponding pressure not only at the brake itself but also at the pressure equalization element 17. Depending on the positive/negative gradient of the parking situation pressures of 5 to 10 bar are realistic.

However, the pressures can also be higher or lower. Furthermore, the pressure level is dependent on how many wheels said pressure is effective at. The pressure equalization element 17 is equipped, for example, with a spring-loaded piston which reacts to a change in pressure with shifting of the piston and therefore with the change in volume. This storage system can be configured in such a way that both a take up of volume and discharging of volume are possible.

The take up of volume at the pressure equalization element 17 becomes effective if, for example, the wheel brake 2 heats up further during the execution of the automated driving maneuver and the brake piston is as a result forced back into the brake caliper. The take-up of volume becomes effective when the brake system heats up further and therefore also the brake fluid is heated. As a result of the comparatively large increase in volume, a significantly higher pressures occurs in the brake system without this accumulator as an equalizing element.

The discharge of volume at the pressure equalization element 17 becomes effective if the brake system subsequently cools and as a result the brake piston can migrate in the direction of the brake disk. The discharge of volume becomes effective when the brake system subsequently cools and therefore the brake fluid also cools. As a result of the comparatively large decrease in volume, a significantly lower pressure arises in the brake system without this accumulator as an equalizing element.

A change in length as a result of heating or cooling can occur in all components of the wheel brake, for example at the brake caliper, brake disk, brake linings etc. The heating or cooling can also lead to a change in volume of the brake fluid.

The pressure equalization element 17 is connected, by means of a storage-type isolating valve 16, to the wheel brake or to the inlet valves 10 and outlet valves 11. The storage-type isolating valve 16 is embodied as bistable valves. The latter can assume a position in which it is open when deenergized. Likewise, said valve can assume a position in which it is closed when deenergized. By means of energization it is possible to switch the storage-type isolating valve 16 between both positions. This control operation is carried out by means of the control device 20. When the storage-type isolating valve 16 is opened, there is a hydraulic connection between the pressure equalization element 17 and the wheel brake 2. When the storage-type isolating valve 16 is closed, the pressure equalization element 17 is decoupled from the wheel brake 2 or from the rest of the brake system 1. At the start of the automated driving maneuver, the storage-type isolating valve 16 is opened for the pressure equalization element 17, and the pressure which is provided becomes effective not only in the service brake system or wheel brake 2 but also in the pressure equalization element 17. During the execution of the automated driving maneuver, there is no need for further energization since the storage-type isolating valve 16 remains in its open position owing to the bistable properties. As a result of the fact that the storage-type isolating valves 16 are open during the entire automated driving maneuver, for example highly automated parking process, corresponding pressure equalization or volume equalization can take place. When the automated driving maneuver is terminated, the storage-type isolating valves are closed. However, the pressure which is still enclosed is to be able to flow away beforehand.

Furthermore, a shutoff valve 15 is provided. In order to lock in the pressure for the parking process in the brake calipers, independently of possible pedal activation, said brake calipers are embodied as bistable valves. The advantage of the bistable valves is that they can be secured in a deenergized state both in the open state and in the closed state. That is to say these shutoff valves are used both during the normal driving mode (deenergized when open) as well as during the parking mode (deenergized when closed). Since they can be secured in their respective position in the deenergized state, there is also no limit of the duration of the respective operating mode. Energization is necessary only for the state of change from closed to open or back. In the opened state, it permits a non-impeded hydraulic connection between the wheel brake 2 and the rest of the components of the hydraulic assembly 19 or the brake pedal device 3. In the closed state, such a hydraulic connection is interrupted. In this case, the wheel brake 2 and the pressure equalization element 17 are decoupled. The hydraulic pressure which is also present there is also locked in. By virtue of the bistable valve design, the motor vehicle can be secured by means of the locked-in pressure even when there is a power failure.

The shutoff valve 15 is advantageously also configured such that it can be bypassed in the direction of the wheel brake 2. That is to say when there is a correspondingly high pressure, a volume of fluid can be forced through the closed valve. To do this, for example the tappet is lifted out of the valve seat by the applied pressure and permits fluid to pass through. The driver can therefore bring about an increase in the already locked in pressure at the wheel brake 2, for example when there is a closed shutoff valve 15, by means of intense activation of the brake pedal 7.

In order to terminate the automated driving maneuver—after transfer e.g. to the APB (not shown)—both the shutoff valves 15 and the storage-type isolating valves 16 are opened, as a result of which the pressure is automatically reduced. After the reduction of the brake pressure, the storage-type isolating valves 16 are closed again, as a result of which the pressure equalization element 17 is disconnected from the brake circuit 4 or 5 and the service brake can act unaffected.

Further configuration alternatives which are not explicitly illustrated in the figures will be described below:

Alternatively, the pressure equalization element 17 can also be introduced at another location in the brake system 1. One possibility would be e.g. between the switching valve 9' and the inlet valve 10.

Of course it is also conceivable for the expansion by means of the pressure equalization element 17 and the storage-type isolating valve 16 and shutoff valve 15 to be implemented at only one brake circuit, that is to say at the brake circuit 4 or brake circuit 5.

It is also conceivable for the expansion to be provided by means of the pressure equalization element 17 and the storage-type isolating valve 16 as well as the shutoff valve 15 only at one wheel or a wheel brake 2. It is also conceivable that the expansion is provided on a wheel-specific basis by the pressure equalization element 17 and the storage-type isolating valve 16 and shutoff valve 15. It is also conceivable for the expansion to be provided by the pressure equalization element 17 and the storage-type isolating valve 16 at a one-box system (Integrated Power Brake—IPB).

It is also conceivable for the expansions which are described above to be provided in an electro-hydraulic brake system (EHB, SBC—Sensotronic Brake Control).

Figure 3:
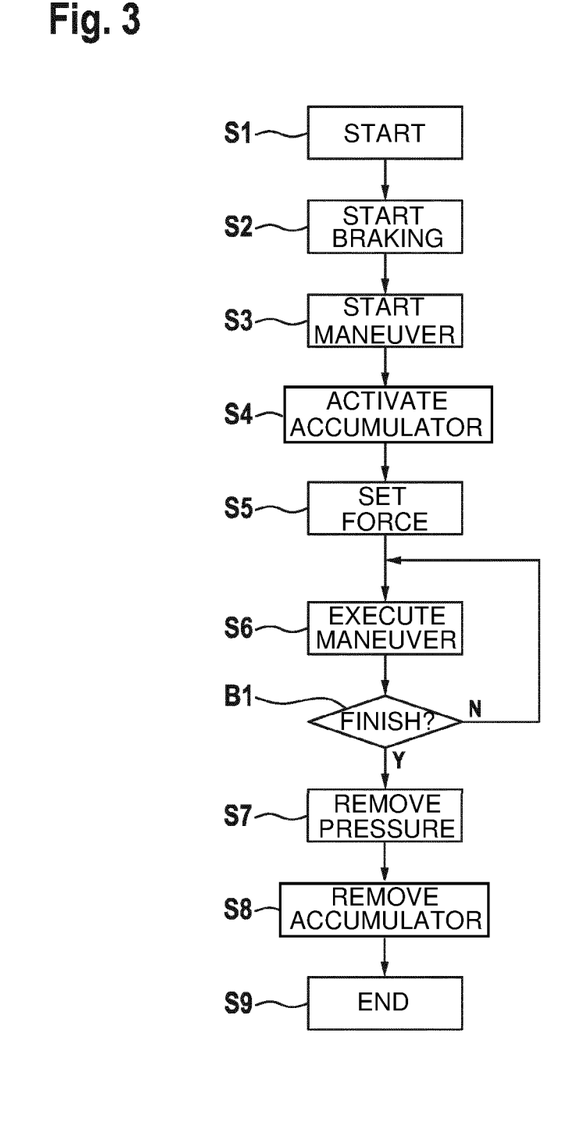
FIG. 3 shows a schematic illustration of the method.

FIG. 3 shows an illustration of the method steps of an embodiment of the disclosure. Here, the start of the method takes place in a first step S1. In a preceding step S2, braking of the vehicle to the stationary state can be provided. In the step S3, the execution of the automated driving maneuver is started. In the next step S4, the hydraulic accumulator is activated, i.e. the hydraulic connection of the pressure equalization element to the rest of the brake system is opened. Furthermore, in a step S5, the clamping force at the wheel brake is set in order to secure the execution of the automated driving maneuver. The hydraulic pressure which is set is subsequently locked in. In a subsequent step S6, the automated driving maneuver is carried out, for example the parking maneuver is started. In the text which follows, it is checked in the condition B 1 whether the driving maneuver has ended. If this is not the case (N), the last step continues to be carried out. However, if it is detected that the driving maneuver is ended (Y), in the next step S7 the hydraulic pressure is removed from the pressure equalization element, and in the step S8 the pressure equalization element is decoupled. The step S9 corresponds to the end of the method.

The invention claimed is:

1. A method for securing a motor vehicle with at least one wheel brake during an automated driving maneuver, the method comprising:
   before execution of the automated driving maneuver, setting a hydraulic pressure at the wheel brake in order to generate a defined braking force that is large enough to reliably stop the motor vehicle during the execution of the automated driving maneuver; and
   maintaining the hydraulic pressure set at the wheel brake essentially constant during the execution of the automated driving maneuver.

2. The method as claimed in claim 1, wherein the maintaining of the hydraulic pressure at the wheel brake includes maintaining the hydraulic pressure constant independently of an energization during the execution of the automated driving maneuver.

3. The method as claimed in claim 1, wherein a pressure equalization element is selectively connected to the wheel brake.

4. The method as claimed in claim 3, further comprising:
   connecting the pressure equalization element to the wheel brake before the execution of the automated driving maneuver.

5. The method as claimed in claim 1, wherein:
   the setting of the hydraulic pressure at the wheel brake includes locking the hydraulic pressure in the wheel brake with a shutoff valve before the execution of the automated driving maneuver; and
   the hydraulic pressure is locked while the automated driving maneuver is executed.

6. The method as claimed in claim 1, further comprising:
   after the execution of the automated driving maneuver, transferring a brake system into at least one of a secured state, a pressureless state, and a regular state.

7. The method as claimed in claim 1, further comprising:
   when the hydraulic pressure at the wheel brake is increased by a defined threshold value:
   in the case of a completely functionally capable brake system, setting the defined braking force to a new value by reducing the hydraulic pressure and continuing the automated driving maneuver; and
   in the case of a brake system which is not completely functionally capable, aborting the automated driving maneuver.

8. A computer program configured to carry out the method as claimed in claim 1.

9. A device configured to carry out a method that includes:
   before execution of an automated driving maneuver, setting a hydraulic pressure at a wheel brake in order to generate a defined braking force that is large enough to reliably stop a motor vehicle during the execution of the automated driving maneuver; and
   maintaining the hydraulic pressure set at the wheel brake essentially constant during the execution of the automated driving maneuver.

10. The device as claimed in claim 9, further comprising:
    a pressure equalization element selectively configured to take up fluid volume when there is an increased pressure at the wheel brake and to output fluid volume when there is a reduced pressure at the wheel brake.

11. The device as claimed in claim 10, further comprising:
    a storage-type isolating valve configured to selectively connect the pressure equalization element to the wheel brake.

12. The device as claimed in claim 10, wherein the pressure equalization element includes a spring-loaded piston system.

13. The device as claimed in claim 9, further comprising:
    a shutoff valve configured to lock in the hydraulic pressure built up at the wheel brake.

14. The device as claimed in claim 9, wherein the device is configured as a hydraulic module, comprising:
    a pressure generating device with an electric actuator configured to generate the hydraulic pressure at the wheel brake;

a connecting device with a shutoff valve configured to connect the wheel brake to or disconnect the wheel brake from the pressure generating device; and a pressure equalizing device with a pressure equalization element configured for volume compensation at the wheel brake.

15. A control device configured to execute program instructions stored in a memory to execute a method for securing a motor vehicle with at least one wheel brake during an automated driving maneuver, the method comprising:

before execution of the automated driving maneuver, setting a hydraulic pressure at the wheel brake in order to generate a defined braking force that is large enough to reliably stop the motor vehicle during the execution of the automated driving maneuver; and maintaining the hydraulic pressure set at the wheel brake essentially constant during the execution of the automated driving maneuver.

* * * * *